Nov. 6, 1962 R. G. MOHR 3,062,066
POWER OPERATOR MECHANISM FOR A FOLDING PARTITION
Filed June 29, 1959 2 Sheets-Sheet 1
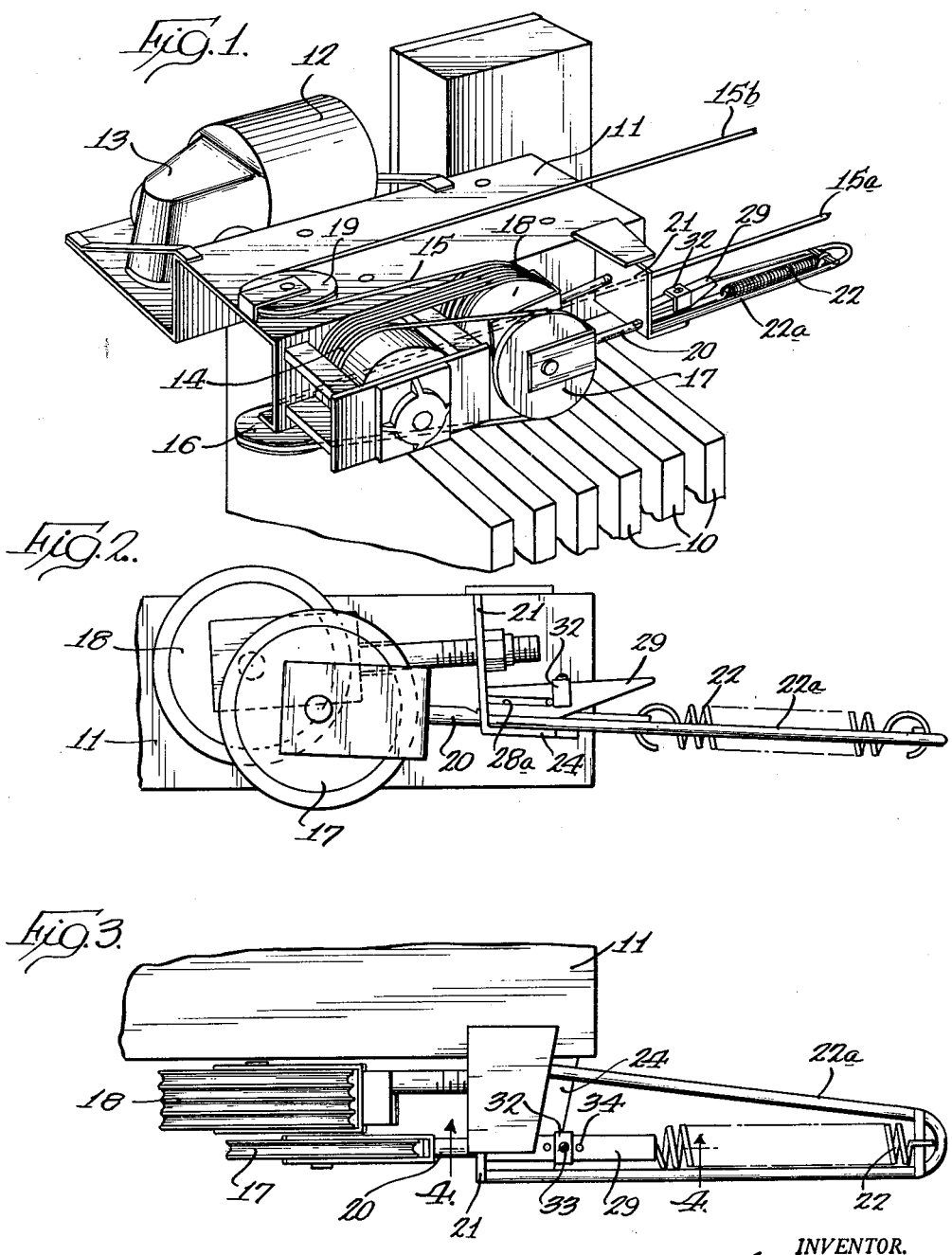
INVENTOR.
Robert G. Mohr
BY Hofgren, Brady,
Wegner, Allen & Stellman
Attys.

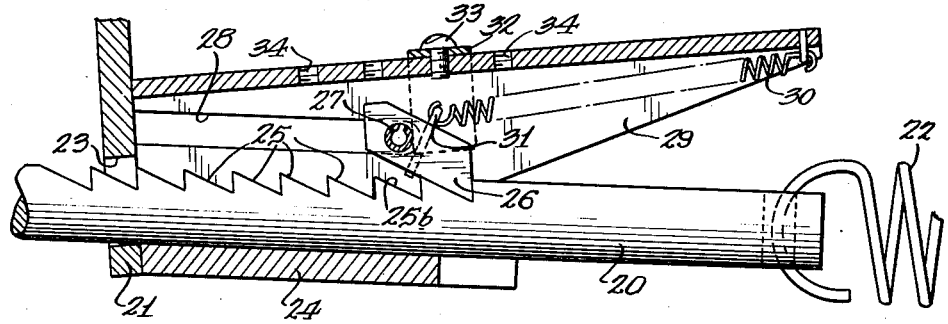
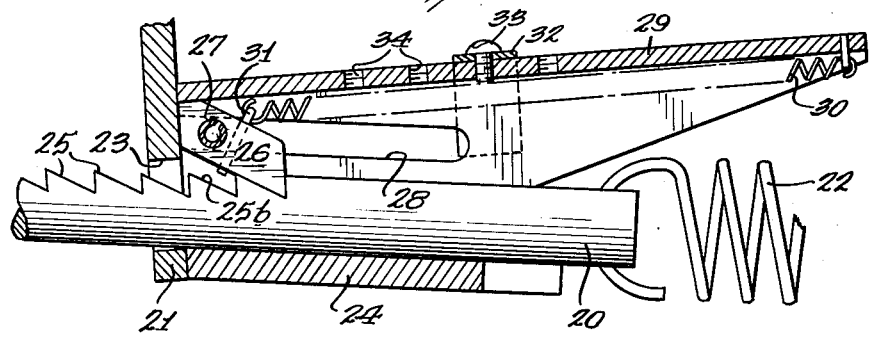
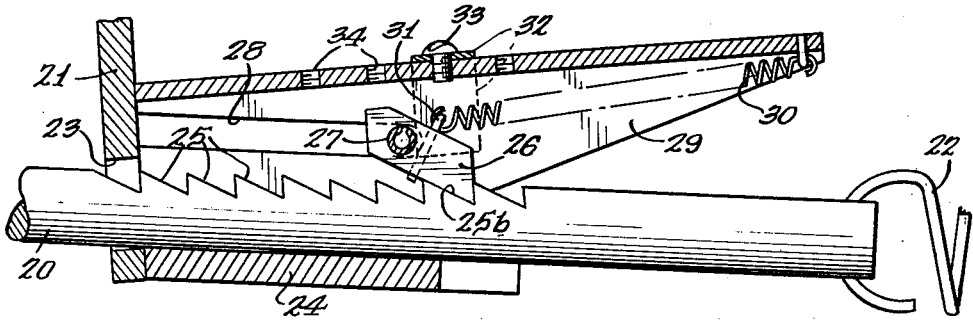

United States Patent Office 3,062,066
Patented Nov. 6, 1962

3,062,066
POWER OPERATOR MECHANISM FOR A FOLDING PARTITION
Robert G. Mohr, Kalamazoo, Mich., assignor to Brunswick Corporation, a corporation of Delaware
Filed June 29, 1959, Ser. No. 823,726
7 Claims. (Cl. 74—222)

This invention relates to a power operator mechanism for a folding partition and more particularly to such a mechanism having a device for automatic take-up of slack in the cable system.

An object of this invention is to provide new and improved folding partition power operating mechanism.

Another object of the invention is to provide a cable slack take-up mechanism for a partition operating cable system in which the cable passes about an idler pulley and means are provided for urging the idler pulley in a direction to take up slack in the cable and automatic means control the position of the idler pulley whereby the pulley permanently takes up slack caused by permanent stretch in the cable while still functioning at all times to temporarily take up temporary slack due to operating tension in the cable.

Another object of the invention is to provide a mechanism as defined in the preceding paragraph in which the idler pulley is mounted for longitudinal movement on a mounting stem slidable in a fixed bracket and said stem has a series of notches formed lengthwise thereof, and said automatic means includes a detent mounted for movement along with said stem and engageable with one of said notches whereby engagement of the detent with the bracket limits movements of the stem in paying out slack, and means for limiting the travel of the detent with the stem in taking up slack whereby additional stem movement causes said detent to shift engagement to another stem notch and take up cable slack due to permanent cable stretch.

Further objects and advantages will become apparent from the following detailed description taken in connection with the accompanying drawings, in which:

FIG. 1 is a fragmentary perspective view of a folding partition and particularly the cable system and power operating means therefor;

FIG. 2 is a fragmentary side elevational view of the drive sheave for the cable and idler pulley and its mounting;

FIG. 3 is a plan view of the structure shown in FIG. 2;

FIG. 4 is a vertical section taken generally along the lines 4—4 on FIG. 3 and showing the mounting stem for the idler pulley positioned to temporarily take up temporary slack in the operating cable;

FIG. 5 is a view similar to FIG. 4 showing the mounting stem for the idler pulley positioned when the idler pulley has payed out temporary slack in the cable; and FIG. 6 is a view corresponding to FIG. 4 and showing the mounting stem for the idler pulley taking up slack and the relocated position of the detent to take up some permanent slack in the cable.

While this invention is susceptible of embodiments in many different forms, there is shown in the drawings and will herein be described in detail an embodiment of the present invention with the understanding that the present disclosure is to be considered as an exemplification of the principles of the invention and is not intended to limit the invention to the embodiment illustrated. The scope of the invention will be pointed out in the appended claims.

As shown in FIG. 1, a folding partition has a series of door panels 10 which are stacked up as shown in the Figure and which may be extended by power means to close an opening. The power means comprises a frame 11 attachable to an overhead framework supporting the partition doors 10. The power means also includes a motor 12 which through a gear reduction unit 13 drives a sheave 14 having a series of grooves about which a cable 15 passes. The cable 15 is endless with a length 15a passing over the partition panels 10 and connected thereto and then about idler pulleys 16 and 17. From the idler pulley 17 the cable passes about the drive sheave 14 and an adjustable idler sheave 18 with several passes between the sheaves 14 and 18. The cable 15 then passes from the idler sheave 18 about an idler pulley 19 with a length 15b extending from the power means.

The motor 12 is reversible and thus the direction of rotation of the drive sheave 14 may be reversed to have the cable travel in the opposite direction. With the cable traveling from the idler 17 to the drive sheave 14 the doors 10 are caused to move to the stacked position, shown in FIG. 1, and travel of the cable in the opposite direction causes the doors to move to an unstacked position.

In operation of a folding partition the cable will gradually have some permanent stretch which results in slack in the cable. This slack must be taken up to insure good frictional engagement of the cable with the sheave 14 and prevent slipping thereon. A temporary stretch condition is also created in the cable 15 when the partition doors 10 are moved to a closed position and when a floor seal carried on each of the doors at the lower end thereof is set by a pull on the cable 15 from the power means. A floor seal is known structure which embodies a movable member at the lower edge of a door which is extended downwardly when a door is moved to a closed position to cause sealing of the door to the floor beneath. The floor seals are operated by movement of doors which in turn are operated by the cable 15 and when they are set the full overload torque of the motor 12 is applied to the cable 15. This results in placing the length 15b of the cable in tension to result in stretching the cable, and this provides a temporary slack in the length 15a of the cable 15.

Means are provided for taking up the permanent slack permanently and for taking up the temporary slack temporarily. The slack created by setting of the floor seals can only be taken up temporarily and must be given back to the cable system as otherwise the cable tension will remain at the high amount needed to set the floor seals and would soon break down the bearings in the drive sheave 14 and idler sheaves 16, 17, 18 and 19. It is also necessary to take up this temporary slack in order to maintain the tight contact of the cable 15 on the sheave 14 to insure drive of the cable.

This means comprises the idler pulley 17 and structure associated therewith. The idler pulley 17 is mounted on a mounting stem 20 which is movably mounted in a bracket 21 attached to the framework 11. The idler pulley 17 is urged in a direction to take up slack by a spring 22 connected to a bracket 22a. The stem 20 slides in an opening 23 in the bracket 21 and rests upon a plate 24 secured to the bracket 21 for guiding of the stem in its movements. It will thus be seen that the idler pulley 17 may move longitudinally in a direction generally toward and away from the drive sheave 14 to take up and pay out slack in the cable 15.

The mounting stem 20 is provided with a series of notches 25 for selective engagement by a detent 26 which is mounted for travel with the mounting stem 20. The detent 26 is mounted on a pin 27 mounted in slots 28 and 28a formed in a housing 29 attached to the bracket 21. The detent is urged into engagement with a stem notch 25 by a spring 30 connected between the housing 29 and a lug 31 on the detent 26.

The detent 26 may thus travel with the stem between limits determined by the bracket 21 and an adjustable stop 32. The adjustable stop 32 may have its position varied by attachment of the stop to housing 29 in any one of several positions by the bolt 33 fitting into one of several threaded openings 34. This stop determines the right-hand limit of detent travel, as viewed in FIG. 4, and the bracket 21 determines the left-hand limit. The detent engages the bracket 21 while the mounting pin 27 for the detent engages the stop 32. The two limit positions are shown in FIGS. 4 and 5, respectively.

In normal operation the length 15a of the cable 15 will be in tension when the doors 10 are being moved to the stacked position shown in FIG. 1. The idler pulley 17 will be at its outer limit, as shown in FIG. 5, as limited by engagement of the detent 26 with the bracket 21 and the detent in engagement with a stem notch 25. When the doors are moved from the position shown in FIG. 1 the length 15a of the cable will then be under less tension and any slack in the cable will be taken up by the spring 22 urging idler pulley 17 by movement thereof and the mounting stem 20 toward the right, as viewed in FIG. 4, with no limit to stem movement except that by the bracket 21 engaging the pulley. This is a temporary condition in normal operation, and the idler pulley will temporarily take care of the slack in the cable. Additional temporary slack can result from the floor seal setting situation described previously. After continued use of the cable system the cable will have some permanent stretch resulting in permanent slack in the cable and this is permanently taken out of the system by the detent 26. More particularly, if the combination of temporary and permanent cable slack reaches an amount whereby the stem will travel toward the right, as viewed in FIG. 4, a distance greater than the travel of the detent 26 toward the right and sufficient to align a notch 25b with the detent 26, the detent 26 will then fall into the notch 25b under the urging of the spring 30. Upon return movement of the idler pulley 17 to return slack to the cable system the idler pulley 17 cannot move as great a distance because of the engagement of detent 26 with the bracket 21 and notch 25b. This shifted engagement of the detent 26 is shown in FIG. 6. It will be seen that the amount of temporary slack that may be taken up and payed out by the idler pulley is determined by the positioning of the stop 32 carried on the housing 29.

I claim:

1. A power operator for use in a folding partition utilizing a cable system subject to slack due to both permanent and temporary cable stretch, comprising reversible means for moving the cable comprising a drive sheave about which the cable passes, and sheave moving the cable in a partition opening direction and in an opposite partition closing direction, a movable idler pulley about which the cable passes postioned to have the cable pass toward the sheave therefrom as the cable moves in a partition opening direction, means urging the idler pulley in a direction to take up temporary slack in said cable as the cable moves in a partition opening direction, and automatic means controlling the position of the idler pulley and actuating said pulley for permanently taking up slack caused by permanent stretch in the cable while still temporarily taking up temporary slack.

2. A power operator as defined in claim 1 in which said pulley is mounted on a movable stem and said automatic means comprises a detent engageable with said stem and having a limited length of travel with the stem which determines the permissible amount of temporary slack in the cable and the limit of the movement of the stem in a direction to pay out slack, and movement of said stem in taking up slack in an amount exceeding the limited length of detent travel results in shift of detent engagement lengthwise of the stem to prevent the idler pulley from traveling as far in the reverse direction in paying out slack.

3. A cable slack take-up mechanism for a partition operating cable system having means for moving a cable and placing the cable under tension, comprising an idler pulley about which the cable passes, means mounting the idler pulley for longitudinal movement including a mounting stem slidable in a fixed bracket, said stem having a series of notches formed lengthwise thereof, a spring urging said stem and pulley in a direction to take up cable slack, a slidable detent engageable with one of said notches, means mounting said detent for travel with the stem as caused by engagement of the detent in the notch, and means for limiting travel of the detent with the stem whereby the detent determines the length of stem travel in a direction to pay out slack and additional stem movement in the opposite direction causes said detent to shift engagement to another stem notch and take up cable slack due to permanent cable stretch.

4. A power operator for a folding partition utilizing a cable system subject to slack due to both permanent and temporary cable stretch comprising, means for moving the cable in a partition opening direction and in an opposite partition closing direction, a movable idler pulley about which the cable passes positioned to have the cable pass toward said means as the cable moves in a partition opening direction, means urging the idler pulley in a direction to take up temporary slack in said cable as the cable moves in a partition opening direction, and automatic means controlling the position of the idler pulley and actuating said pulley for permanently taking up slack caused by permanent stretch in the cable while still temporarily taking up temporary slack.

5. In a cable slack take-up mechanism for a partition operating cable system having means for moving the cable and placing the cable under tension, comprising an idler pulley about which the cable passes, means mounting the idler pulley for longitudinal movement including a mounting stem slidable in a fixed bracket, said stem having a series of notches formed lengthwise thereof, a spring urging said stem and pulley in a direction to take up cable slack, a slidable detent selectively engageable with one of said notches, means mounting said detent for travel with the stem as caused by engagement of the detent in the notch, engagement of said detent and bracket limiting movement of the stem in a direction to pay out slack, and means for limiting travel of the detent with the stem when taking up slack whereby additional stem movement causes said detent to shift engagement to another stem notch whereby the idler pulley cannot move as far to pay out slack and thus cable slack due to permanent cable stretch is taken up.

6. A power operator for a folding partition utilizing a cable system subject to both permanent and temporary stretch in operation, comprising reversible means for exerting a pull on said cable in either of two opposite directions, an idler pulley about which said cable passes in its travel, means mounting said idler pulley for longitudinal movement, means urging said idler pulley in a direction to take up slack in the cable, and means for controlling the position of the idler pulley to permanently remove from the system slack caused by permanent cable stretch while taking up cable slack due to tension induced stretch in the cable and releasing said temporary slack when the tension is released.

7. In a power operator utilizing a cable system subject to both permanent and temporary stretch in operation, comprising means for exerting a pull on said cable in either of two opposite directions, an idler pulley about which said cable passes in its travel, means mounting said idler pulley for movement in either direction along a fixed path, means urging said idler pulley in a direction to take up slack in the cable, and means for controlling the position of the idler pulley to permanently remove from the system slack caused by permanent cable stretch while taking up cable slack due to tension induced stretch in the cable and releasing said temporary slack when the tension is released.

References Cited in the file of this patent

UNITED STATES PATENTS

| | | |
|---|---|---|
| 1,901,635 | Dunlop | Mar. 14, 1933 |
| 2,372,648 | Beskin | Apr. 3, 1945 |
| 2,612,988 | Andrews | Oct. 7, 1952 |
| 2,764,031 | Nystrom | Sept. 25, 1956 |

FOREIGN PATENTS

| | | |
|---|---|---|
| 465,396 | Great Britain | May 6, 1937 |